(12) United States Patent
Piunti et al.

(10) Patent No.: US 10,862,330 B2
(45) Date of Patent: Dec. 8, 2020

(54) WIRELESS CHARGING AND DOCKING SYSTEM FOR MOBILE ELECTRONIC DEVICES

(71) Applicant: Datalogic IP Tech S.r.l., Lippo di Calderara di Reno (IT)

(72) Inventors: Mattia Piunti, Longara (IT); Daniele Roppoli, Ciampino (IT); Simone Paolizzi, Rimini (IT)

(73) Assignee: DATALOGIC IP TECH S.R.L., Lippo di Calderara di Reno (IT)

( * ) Notice: Subject to any disclaimer, the term of this patent is extended or adjusted under 35 U.S.C. 154(b) by 381 days.

(21) Appl. No.: 15/885,637

(22) Filed: Jan. 31, 2018

(65) Prior Publication Data

US 2019/0237985 A1 Aug. 1, 2019

(51) Int. Cl.
| | |
|---|---|
| H02J 7/00 | (2006.01) |
| H02J 7/02 | (2016.01) |
| H02J 50/80 | (2016.01) |
| H02J 50/10 | (2016.01) |

(52) U.S. Cl.
CPC ............ *H02J 7/025* (2013.01); *H02J 7/0047* (2013.01); *H02J 50/10* (2016.02); *H02J 50/80* (2016.02)

(58) Field of Classification Search
CPC .. H02J 7/025; H02J 50/80; H02J 50/10; H02J 7/0047; H01F 38/14; Y02T 90/122; B60L 11/182; Y02E 60/12
See application file for complete search history.

(56) References Cited

U.S. PATENT DOCUMENTS

| | | | |
|---|---|---|---|
| 8,517,273 B2 | 8/2013 | Tamburrini et al. | |
| 2011/0221391 A1 | 9/2011 | Won et al. | |
| 2011/0227527 A1 | 9/2011 | Zhu et al. | |
| 2011/0260681 A1 | 10/2011 | Guccione et al. | |
| 2013/0049682 A1* | 2/2013 | Niec ..................... | H02J 7/0044 320/108 |
| 2013/0154555 A1* | 6/2013 | Miller ................... | H02J 7/0042 320/108 |
| 2015/0028797 A1* | 1/2015 | Miller ................. | H02J 2207/40 320/103 |
| 2015/0326058 A1 | 11/2015 | Chu | |

OTHER PUBLICATIONS

Orico, Orico 5 USB Port Charger with QI Wireless Charging Mode (OCP-5US), available at: http://pe.orico.cc/goods.php?id=6086, visited on Nov. 30, 2017, 5 pgs.
Gearbest, Itian A16 Portland Charger, available at: https://gearbest.com/iphone-mounts-holders/pp_234669.html, visited Nov. 30, 2017, 7 pgs.

* cited by examiner

*Primary Examiner* — Arun C Williams
(74) *Attorney, Agent, or Firm* — Stoel Rives LLP

(57) ABSTRACT

A modular cradle for a mobile device includes a base structure having a first acceptance structure designed for receiving the mobile device, where the mobile device is removable from the first acceptance structure for use. The cradle also includes a wireless charging device configured to wirelessly transmit power to the mobile device when in the first acceptance structure. The wireless charging device includes a controller and a transmitter enclosed within a single housing, where the wireless charging device is attachable to and removable from a second acceptance structure of the modular cradle.

20 Claims, 3 Drawing Sheets

WIRELESS CHARGING AND DOCKING SYSTEM FOR MOBILE ELECTRONIC DEVICES

BACKGROUND

The field of the present disclosure relates generally to systems and methods for wireless charging of handheld and mobile electronic devices, and in particular, to such systems including a modular cradle designed for securing the electronic device and a wireless charging unit, where the charging unit may be detachable from the modular cradle for improved flexibility.

Mobile devices, such as phones, computers, and other electronic devices, have become commonplace in modern societies, as for many people such devices are rapidly becoming the primary source for receiving information and communicating with others. Typically, a person has at least one mobile device, such as a mobile phone, that they carry everywhere they go. While technology has improved over the years to maximize use of mobile devices and increase battery life and efficiency, all electronic devices require charging from time to time. Typically, the mobile device is paired with a charging unit for recharging the battery as needed. Most commonly, such charging units are wired devices that require connection to a power source to charge the mobile device. The wires of these units must be maintained to avoid the wires tangling together or creating hazards that may be lead to damage of the mobile device, such as by inadvertent snagging and pulling of the wires. More recently, docking stations have been developed to provide a convenient method for charging a phone while also providing improved wire maintenance. Some docking stations provide a cradle designed to secure and hold the mobile device during charging, while other docking stations provide wireless charging options for a more streamlined solution.

Many of these conventional docking stations were specifically designed to match the contour and shape of the mobile device to ensure that the device fit and was properly secured within the docking station. Accordingly, docking stations were not easily interchangeable and/or not suitable for use with different mobile devices. However, since the average life cycle of early mobile devices typically ranged between 5-8 years, the lack of flexibility of the docking stations was a minor issue. When it came time to replace the mobile device, the docking stations were also likely in need of replacement after long-term use.

In the current market, mobile device trends are driven more by consumer technologies than by the useful life of the mobile device itself. In other words, mobile devices are now perceived to require replacement after 2-3 years of use even though the device itself remains in working order because the operating systems and/or other software is no longer supported for the device, or because consumers simply desire new devices. Typically, when a user purchases a new mobile device, the user also purchases a docking station and other accessories designed for use with the particular mobile device. The previous docking stations and accessories, although still in working condition after a few years of use, may not be compatible with the new mobile device, thereby requiring replacement.

Accordingly, the present inventors have determined that it would be desirable to have a docking system with a modular design having interchangeable components and accessories to improve flexibility of the docking system and to accommodate use with multiple mobile devices. The present inventors have also identified a need for such a docking system designed for receiving a wireless charging power supply to simplify charging for various mobile devices, the wireless charging power supply being removable from the docking system as desired. Additional aspects and advantages of such systems will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

DETAILED DESCRIPTION OF DISCLOSED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, certain embodiments may describe use of the docking station and wireless charging power supply for charging mobile devices such as mobile phones or data readers. It should be understood these examples are merely example uses for the described system and should not be considered as limiting. In other embodiments, the docking and charging system may be used in conjunction with any one of a variety of electronic devices other than phones and data readers, such as cameras, music players, cameras, or any other electronic device suitable for wireless charging.

FIGS. 1-5 collectively illustrate details of a wireless charging solution that provides full portability and allows use with a variety of docking stations for accommodating different devices. In some embodiments, the wireless charging solution includes a wireless charging power supply (also referred to herein as a wireless charger) designed to be self-contained such that it is removable and replaceable from the cradle or docking station. In some embodiments, the wireless charging power supply is configured to fit in small spaces such that it can be easily carried in a pocket or bag, and/or may include an internal power supply (e.g., a battery) to facilitate use without requiring connection to an external power source. The internal power supply may be replaceable or may be rechargeable such that it can be charged when the wireless charging power supply is connected to external power.

As further described in detail below, the disclosed systems and methods may provide several advantages over conventional devices, such as: (1) providing the ability to reuse as many accessories and components when users upgrade or purchase new mobile devices; (2) providing a modular design for a docking station and charging supply to allow for expanded customization and options; and (3) allowing users to purchase a basic docking station and add specific features as desired to accommodate their changing needs over time. Additional details and information of these embodiments is further described below with specific reference to the figures.

Figure 1:
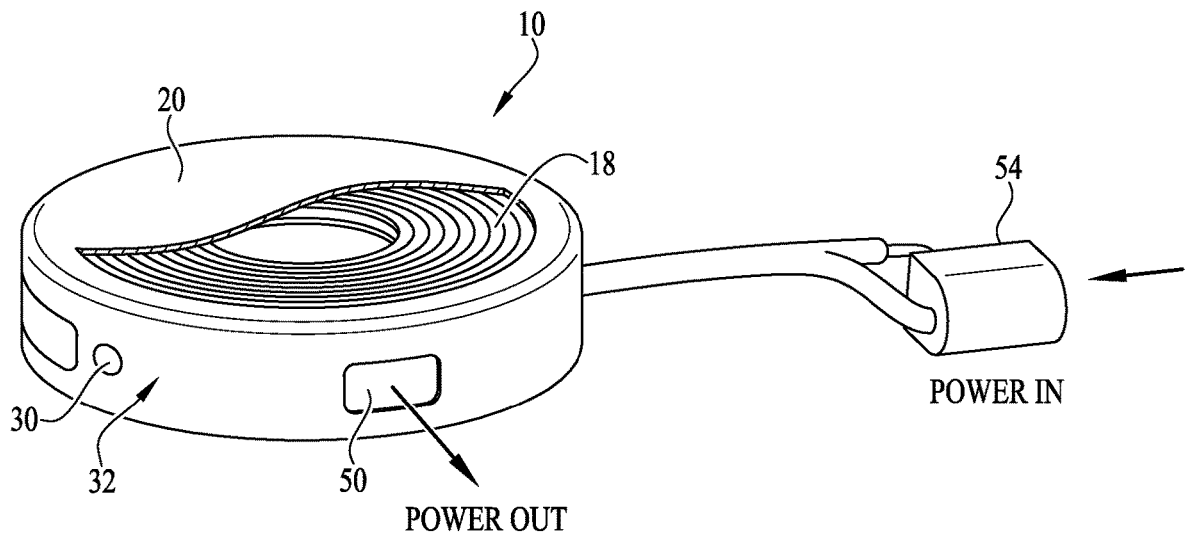
FIGS. 1 and 2 collectively illustrate various views of a wireless charging power supply in accordance with one embodiment.
Figure 2:
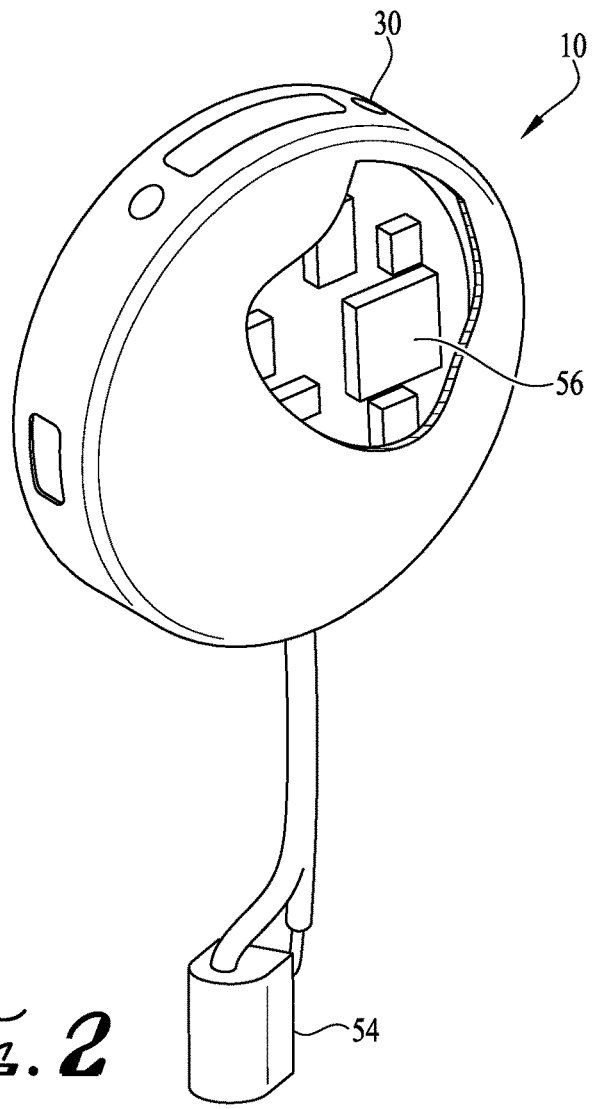
Figure 3:
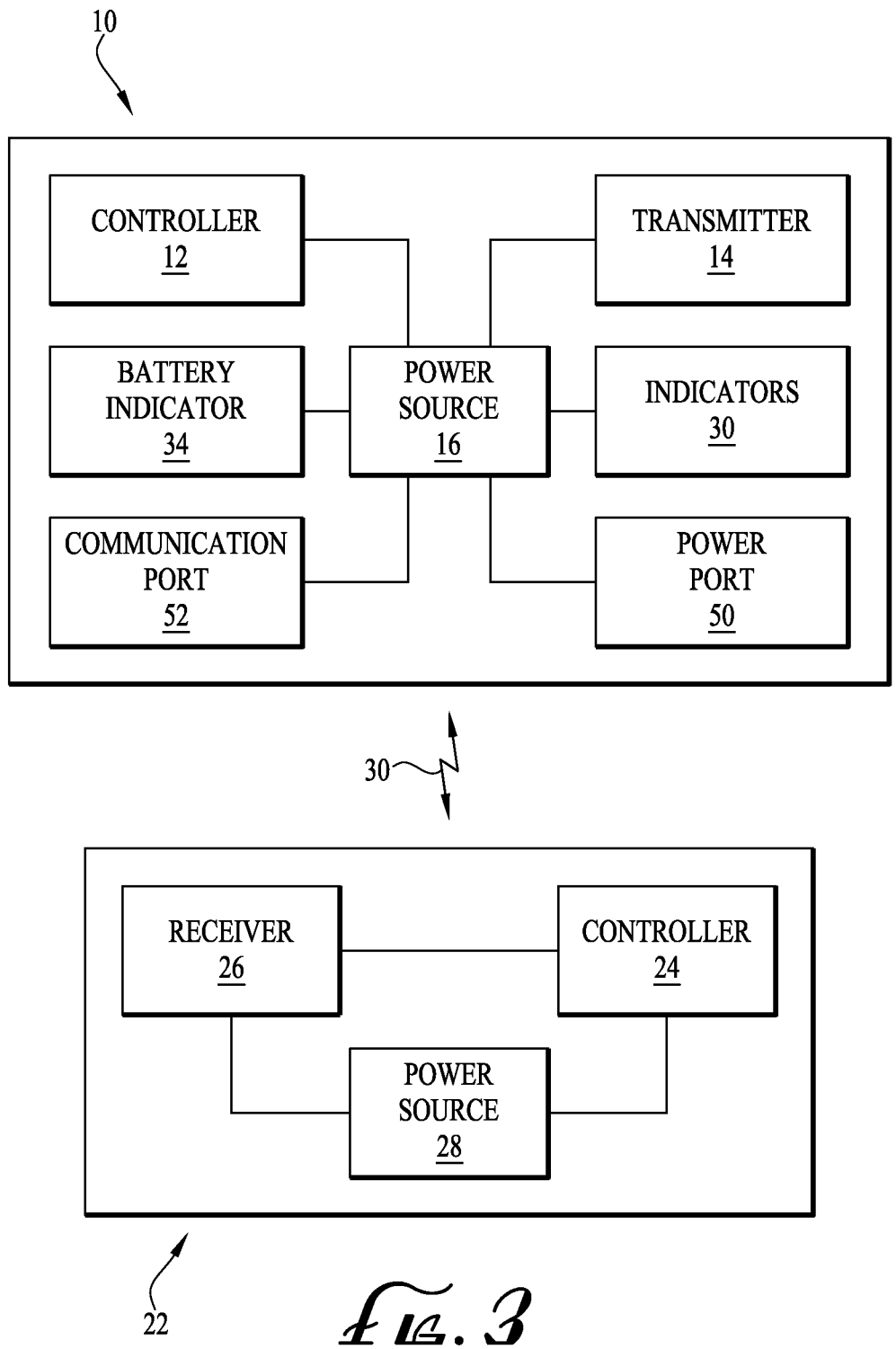
FIG. 3 is a block diagram illustrating internal components of the wireless charging power supply of FIGS. 1 and 2, and interaction of the power supply with an example electronic device.

FIGS. 1-3 collectively illustrate details of a wireless charger 10 in accordance with one embodiment. As best illustrated in FIG. 3, the wireless charger 10 includes a controller 12 having control circuitry for operating the wireless charger 10. The controller 12 is in operable communication with a transmitter 14 and a power source 16. The controller 12 is operable to control the operation of the wireless charger 10, for example, by controlling the voltage and/or current supplied from the power source 16 to the transmitter 14 so that the electromagnetic field generated by the primary coils 18 (see FIG. 1) will efficiently induce appropriate voltage and current waveforms in the secondary coils (not shown). In other embodiments, the voltage and current supplied to the transmitter 14 can be controlled by other known power conditioning or regulating components. The power source 16 of the wireless charger 10 may include any suitable power source, such as rechargeable batteries, nickel cadmium, lithium ion, nickel zinc, or any other type of rechargeable or non-rechargeable battery. Preferably, the controller 12, transmitter 14, and power source 16 are all housed in a single housing 20 for improved portability of the wireless charger 10, as described previously.

FIG. 3 also illustrates an example mobile device 22 that may be charged via the wireless charger 10. With reference to FIG. 3, the mobile device 22 may include a controller 24 coupled to a receiver 26 and a power source 28. The controller 24 of the mobile device 22 is configured to control the operation of the mobile device 22, for example, by regulating and converting the voltage or current received by the receiver 26 to provide appropriate power levels to charge the power source 28 and other components of the mobile device 22 as needed. It should be understood that the block diagram in FIG. 3 illustrates an example embodiment and should not be considering limiting. In other embodiments, the components of the wireless charger 10 and the mobile device 22 may be modified and coupled together in any suitable arrangement without departing from the principles of the disclosed subject matter. With reference to FIG. 3, the following describes an example charging process using the wireless charger 10 and the mobile device 22.

FIG. 3 illustrates a wireless power coupling 30 that transmits power from the wireless charger 10 to the mobile device 22 when the mobile device 22 contacts or rests on the wireless charger 10. With reference to FIG. 3, the wireless charging method described herein is an inductive coupling method. In other embodiments, other wireless power transfer methods may be used, such as radio waves, microwaves, laser power transfer, or other suitable energy transfer methods. Accordingly, while the following process briefly describes an inductive coupling method, any other wireless power transfer methods may be used in other embodiments.

Generally speaking, in an inductive coupling process, the transmitter 14 includes or is coupled to a primary transmitter coil 18 and the receiver 26 includes or is coupled to a secondary receiver coil (not shown). The primary coil 18 generates an electromagnetic field when power is supplied and the electromagnetic field induces a power flow in the secondary coil when it is aligned in the electromagnetic field. The power flow in the secondary coil can then be used to charge the power source 28 of the mobile device 22.

With reference to FIG. 2, the wireless charger 10 also includes one or more indicators 30 located on an exterior surface 32 of the charger 10, and powered via the power source 16. The indicators 30 may be any one of a variety of suitable components, such as light-emitting diodes (LEDs) or other preferably illuminated indicators, that are arranged at any suitable location on the exterior surface 32 of the wireless charger 10 for easy viewing by a user. In some embodiments, one or more of the indicators 30 may serve as a charge status indicator, such as by illuminating a yellow light when a mobile device 10 is being charged, and a green light when the device is fully charged. In other embodiments, one or more indicators 30 may indicate a level of the power source 16 of the wireless charger 10. For example, with reference to FIG. 3, the wireless charger 10 may include a battery level indicator 34 in operable communication with the power source 16, where the battery level indicator 34 detects the power capacity of the power source 16. The battery level indicator 34 then provides a visual indication of the power capacity via the one or more indicators 30. It should be understood that while the indicators 30 are illustrated and described as visual indicators, in other embodiments, the wireless charger 10 may also incorporate additional and/or alternative indicators, such as a buzzer 56, or an audio system (not shown) operable to deliver audible tones, sounds, or messages to communication information to the user.

In other embodiments, the indicators 30 may relate to other status indicators. For example, the indicators 30 may provide information regarding a connection status of the wireless charger 10 with other devices, such as external servers, networks, or other communication devices, where the external devices may be used to communicate with the wireless charger 10. In still other embodiments, the indicators 30 may also indicate a status related to the docking cradles or stations 36, 44 (see FIGS. 4-5) to which the mobile device 22 is coupled. For example, the indicator 30 may indicate whether the mobile device 22 is properly received in the docking station or cradle 36, 44 and whether the wireless charger 10 is charging the mobile device 22. Additional details of the docking cradles or stations 36, 44 are further described in detail below with reference to FIGS. 4-5.

With reference to FIG. 1, the wireless charger 10 includes a connector 54 for connecting the wireless charger 10 to an external power source, such as an electrical wall outlet or an external battery. The received power is used to power the electrical components of the wireless charger 10 and to transmit power via the transmitter 14 to the mobile device 22 or to another suitable device when placed on the wireless charger 10. In some embodiments, the supplied power may also be used to charge the power source 16 of the wireless charger 10. Typically, when the charger 10 is connected to the external power supply, the supplied power bypasses the internal power source 16 powers the transmitter 14 directly while simultaneously charging the internal power source 16 as needed.

Figure 4:
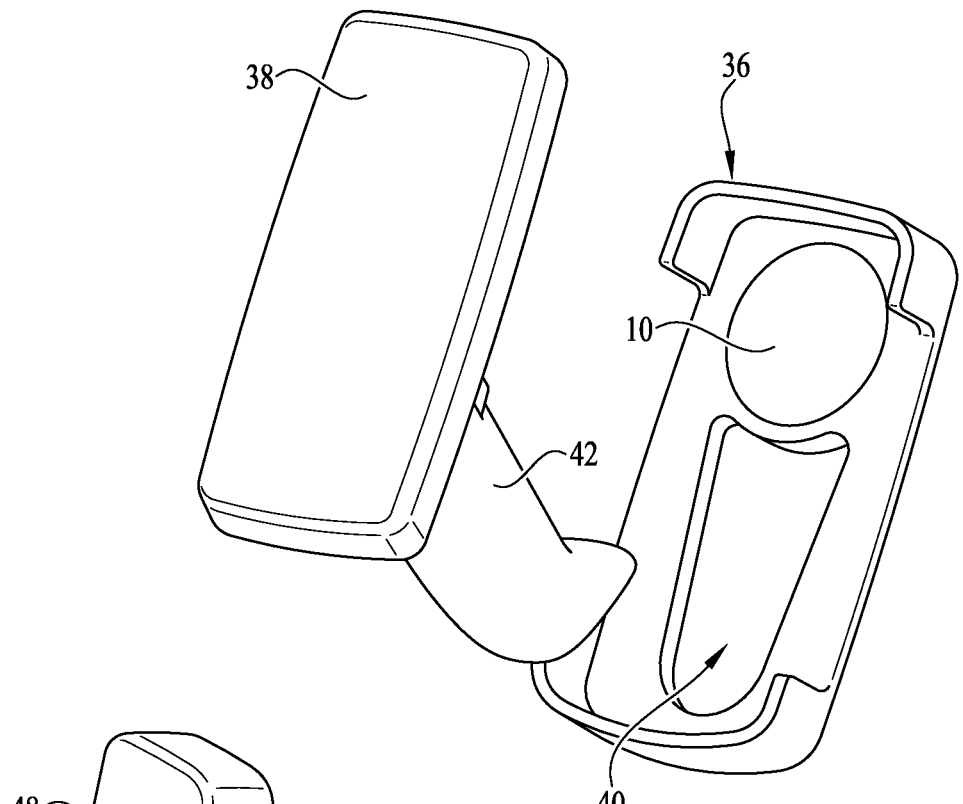
FIGS. 4 and 5 are schematic illustrations of modular docking stations for receiving the wireless charging power supply and charging an electronic device.
Figure 5:
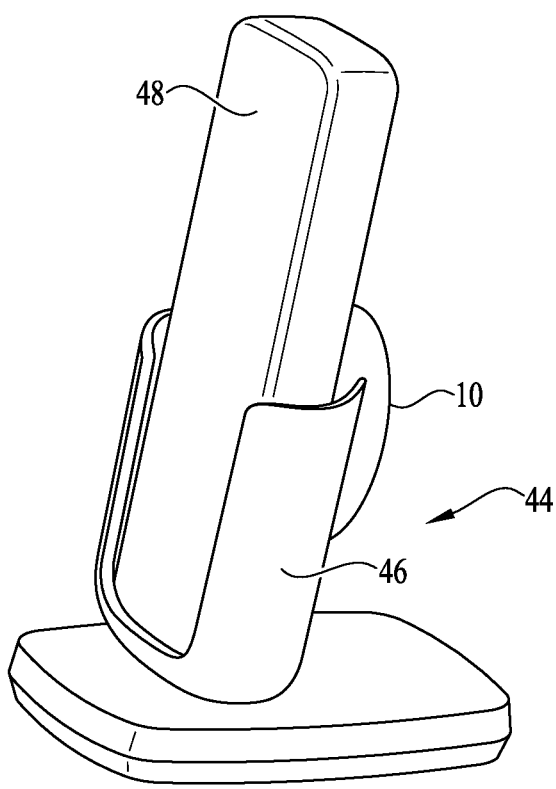

FIGS. 4 and 5 are schematic illustrations of modular docking cradles or stations for receiving the wireless charging power supply and charging the mobile device. With reference to FIG. 4, in one embodiment, the docking cradle 36 is designed with a suitable acceptance structure to receive and secure a mobile device 38. The acceptance structure may take any one of suitable forms, such as a post, a slot, or other features that may orient the device in a suitable manner to facilitate placement into and extraction out of the cradle 36. Preferably, the acceptance structure is passive and does not provide any charging functionality to the mobile device 38. For example, with reference to FIG. 4, the cradle 36 includes an acceptance structure in the form of an opening or aperture 40 designed to receive the handle 42 of the mobile device 38. The cradle 36 also positions the mobile device 38 in an orientation that allows the device to be used while sitting in the cradle 36. As illustrated in FIG. 4, the mobile device 38 may be a data reader, and is preferably oriented within the cradle 36 such that the device 38 may be used to read passing items while remaining positioned in the cradle 36.

Preferably, the cradle 36 further includes an acceptance portion or structure for receiving the wireless charger 10 therein for charging the mobile device 38. With reference to FIG. 4, the cradle 36 includes an opening or aperture (not numbered) sized and dimensioned to receive the wireless charger 10 therein as illustrated. Preferably, the acceptance portion or structure is designed such that it secures the wireless charger 10 therein, but also allows for easy removal and replacement of the wireless charger 10 as needed. For example, the wireless charger 10 may be removed from the cradle 36 as desired and used in another device or docking station, or may be used as a standalone wireless charger without a docking station. The wireless charger 10 can then be slid or embedded back into the opening on the cradle 36 to charge the device 38 when it is secured within the cradle 36.

In other embodiments, the wireless charger 10 may be attached or otherwise coupled to the cradle 44 instead of being embedded thereto. For example, with reference to FIG. 5, the cradle 44 includes a receiving unit 46 for securing the mobile device 48 therein. The wireless charger 10 may be attached to a receiving unit 46 or to another component of the cradle 44. Preferably, the wireless charger 10 is coupled using a suitable mechanism that both securely attaches the wireless charger 10 to the cradle 44 and also facilitates detachment of the wireless charger 10 when desired. For example, in one embodiment, the wireless charger 10 may be magnetically attached to the cradle 44 or receiving unit 46. In other embodiments, the wireless charger 10 may be attached to the cradle 44 or receiving unit 46 using hook and loop fastening means. In some embodiments, magnets (not shown) may be used to couple the wireless charger 10 to the cradle 44 to facilitate easy attachment and detachment as needed. When the wireless charger 10 is attached to the cradle 44, it may be used to charge the mobile device 48 when the device 48 is seated within the receiving unit 46. When the wireless charger 10 is detached from the cradle 44, the wireless charger 10 may be used as a standalone wireless charger to charge a suitable electronic device.

In some embodiments, the wireless charger 10 may further include a power out port 50 as illustrated in FIG. 1. The power out port 50 may be used to provide power to peripherals or features of the cradles 36, 44 from the wireless charger 10, such as for powering one or more modules (e.g., slave modules, passive modules, or any other suitable modules) implemented in the receiving units 46 or other acceptance structures for the mobile devices 38, 48. In other words, the wireless charger 10 may function as a power pass-through for peripherals present on the cradles 36, 44.

In other embodiments, the wireless charger 10 may also include a communication port 52 to facilitate the wireless communication between the docked mobile device 38, 48 and an external database, server, or other system connected to the wireless charger 10. For example, the communication port 52 may allow one or more communication modules (e.g., slave modules, passive modules, or any other suitable modules) implemented in the receiving units 46 or other acceptance structures for the mobile devices 38, 48, and the mobile device 38, 48 to communicate data with each other wirelessly, such as through RFID, Near Field Communication, or other optical data transfer methods. The data may include a variety of information, such as charging status, battery power level, identification information for the wireless charger 10 and/or the mobile device 38, 48. In some embodiments, the identification information may be used to determine whether the wireless charger 10 is compatible with the mobile device to determine whether it can charge the mobile device 38, 48. The communication port 52 may also be used to connect an external device, such as a computer or other mobile device, to communicate with the wireless charger 10 and activate or control components of the wireless charger 10, such as the indicators 30 (e.g., change colors or activate the buzzer), or to update protocols/software of the wireless charger 10, or to control other components as desired.

In some embodiments, the communication port 52 may also be operable to communicate with the cradles 36, 44 if desired. For example, in some embodiments, the wireless charger 10 may be in operable communication with one or more passive modules (e.g., slave modules, passive modules, or any other suitable modules) implemented in the receiving units 46 or other acceptance structures for the mobile devices 38, 48. In such embodiment, the communication port 52 may be used to facilitate communication, such as via a mobile device or other connected computer, to control performance features of the cradles 36, 44.

It is intended that subject matter disclosed in portion herein can be combined with the subject matter of one or more of other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A modular cradle for a mobile device, the cradle comprising:
a base structure;
a first acceptance structure formed on the base structure and designed for receiving the mobile device, wherein the mobile device is removable from the first acceptance structure;
a wireless charging device configured to transmit power to the mobile device received in the first acceptance structure, wherein the wireless charging device is a self-contained modular device that includes a housing that entirely encloses a transmitter and a controller operably coupled and configured to wirelessly transmit power to the mobile device; and a second acceptance structure formed on the base structure and designed for receiving the wireless charging device, wherein the wireless charging device is removably coupled to the base structure via the second acceptance structure, wherein the mobile device is a data reader, and wherein the first acceptance structure is arranged to orient the data reader toward a read zone while maintaining the data reader in the modular cradle for reading data on items passing through the read zone.

2. The modular cradle of claim 1, wherein the second acceptance structure is an opening formed on the base structure, the opening sized and dimensioned to removably secure the wireless charging device therein.

3. The modular cradle of claim 1, wherein the second acceptance structure extends upwardly from the base structure, the second acceptance structure operable to couple with the wireless charging device.

4. The modular cradle of claim 1, wherein one of the second acceptance structure and the wireless charging device further includes one or more magnets configured to magnetically couple the wireless charging device to the second acceptance structure.

5. The modular cradle of claim 1, wherein the wireless charging device
further comprising a battery enclosed within the housing, and coupled to the transmitter and the controller to provide power thereto when the wireless charging device is not connected to an external power supply.

6. The modular cradle of claim 1, wherein the wireless charging device further includes one or more indicators arranged on a surface thereof, the one or more indicators communicating a state associated with the wireless charging device.

7. The modular cradle of claim 1, wherein the wireless charging device is in communication with the modular cradle, the wireless charging device further including one or more indicators arranged on a surface thereof, the one or more indicators communicating a state associated with the modular cradle.

8. The modular cradle of claim 1, wherein the first acceptance structure further includes one or more modules, and wherein the wireless charging device further comprises a power out port for powering at least one of the one or more modules.

9. The modular cradle of claim 1, the wireless charging device further comprising a communication port in operable communication with an external system, wherein the wireless charging device is configured to communicate with the external system via the communication port.

10. The modular cradle of claim 1, the wireless charging device further comprising a communication port in operable communication with the modular cradle, wherein the wireless charging device is configured to communicate with the modular cradle via the communication port.

11. The modular cradle of claim 1, the wireless charging device further comprising a communication port in operable communication with an external system, wherein the mobile device docked in the first acceptance structure is configured to communication with the external system via the communication port.

12. The modular cradle of claim 1, the wireless charging device further comprising an electrical connection to receive power from an external power source.

13. The modular cradle of claim 6, wherein the state communicated by the one or more indicators includes a charging status of the wireless charging device.

14. The modular cradle of claim 6, wherein the state communicated by the one or more indicators includes a battery power level of the wireless charging device.

15. The modular cradle of claim 6, wherein the state communicated by the one or more indicators includes a communication status of the wireless charging device with external device.

16. The modular cradle of claim 9, wherein the wireless charging device is configured to communicate with the external system via at least one of RFID or Near Field Communication.

17. The modular cradle of claim 1, wherein the first acceptance structure is configured as one of a post or a slot.

18. The modular cradle of claim 1, wherein the power out port is configured as a power pass-through for peripheral devices separate from the mobile device.

19. The modular cradle of claim 1, wherein the housing further encloses at least one of a buzzer or an audio system operable to deliver audible tones, sounds, or messages to communication information to the user.

20. The modular cradle of claim 5, wherein the battery is a rechargeable battery configured to be charged when the wireless charging device is connected to the external power supply.

* * * * *